(12) United States Patent
Kang et al.

(10) Patent No.: US 8,289,637 B2
(45) Date of Patent: Oct. 16, 2012

(54) FOCUS ADJUSTMENT DEVICE FOR USE IN PORTABLE IMAGE PROJECTION APPARATUS

(75) Inventors: Boing-jo Kang, Suwon-si (KR); Jun-seok Park, Suwon-si (KR); Sang-ik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 12/977,674

(22) Filed: Dec. 23, 2010

(65) Prior Publication Data

US 2011/0292524 A1   Dec. 1, 2011

(30) Foreign Application Priority Data

May 31, 2010  (KR) .................. 10-2010-0051079

(51) Int. Cl.
  *G02B 7/02*   (2006.01)
  *G02B 15/14*  (2006.01)
  *G03B 13/00*  (2006.01)
  *G03B 17/00*  (2006.01)

(52) U.S. Cl. ........ 359/823; 359/826; 359/694; 348/345; 396/79; 396/83; 396/144

(58) Field of Classification Search .......... 359/811, 359/822–826, 422, 694–700; 348/65, 143, 348/345, 352, 373; 353/100, 101; 396/67, 396/83, 90, 117, 141, 142, 144, 133, 167, 396/176, 214

See application file for complete search history.

(56) References Cited

U.S. PATENT DOCUMENTS

| 4,126,871 | A | * | 11/1978 | Tamura et al. | 396/90 |
|---|---|---|---|---|---|
| 4,163,613 | A | * | 8/1979 | Smart | 396/144 |
| 4,303,320 | A | * | 12/1981 | Isono | 396/117 |
| 4,303,323 | A | * | 12/1981 | Imai et al. | 396/141 |
| 4,482,228 | A | * | 11/1984 | Fujita | 396/73 |
| 4,965,615 | A | * | 10/1990 | Fujita et al. | 396/83 |
| 5,196,963 | A | * | 3/1993 | Sato et al. | 359/699 |
| 5,530,496 | A | * | 6/1996 | Mizukawa et al. | 353/63 |
| 5,815,328 | A | * | 9/1998 | Makita | 359/824 |
| 6,011,657 | A | * | 1/2000 | Labaziewicz | 359/691 |
| 7,495,843 | B2 | * | 2/2009 | Ge et al. | 359/699 |
| 2010/0265475 | A1 | * | 10/2010 | Jeon et al. | 353/101 |

* cited by examiner

*Primary Examiner* — Loha Ben
(74) *Attorney, Agent, or Firm* — Sughrue Mion, PLLC

(57) ABSTRACT

A focus adjustment device for adjusting a focus state of a projection lens unit in an image projection apparatus is provided. The focus adjustment device includes a focus adjustment member rectilinearly movable in a first direction; a rotational shaft; a first movement-converting member for converting a rectilinear movement of the focus adjustment member into a rotary movement of the rotational shaft; and a second movement-converting member for converting the rotary movement of the rotational shaft into in a rectilinear movement of the projection lens unit along a focusing direction.

20 Claims, 8 Drawing Sheets

FOCUS ADJUSTMENT DEVICE FOR USE IN PORTABLE IMAGE PROJECTION APPARATUS

CROSS-REFERENCE TO RELATED APPLICATIONS

This application claims priority from Korean Patent Application No. 10-2010-0051079, filed May 31, 2010, in the Korean Intellectual Property Office, the disclosure of which is incorporated herein by reference in its entirety.

BACKGROUND

1. Field

Apparatuses and methods consistent with exemplary embodiments relate to an image projection apparatus, and more specifically, to a focus adjustment device for use in a portable image projection apparatus.

2. Description of the Related Art

An image projection apparatus is an apparatus for magnifying an image and projecting the magnified image onto a screen. As a typical example of the image projection apparatus, there is a projector. Previously, because the image projection apparatus has been used in displaying materials for presentation in certain places, such as a meeting room, a classroom, and so on, there was no need for a user to carry the image projection apparatus.

However, these days, portable multimedia apparatuses, such as a digital camera, a digital camcorder, a portable media player (PMP), a notebook PC, and a mobile phone, are widely used. As the applicability of such portable multimedia apparatuses has gotten higher, there has been a demand for conveniently sharing an image played by the portable multimedia apparatuses with other people anywhere. Accordingly, research for miniaturizing the image projection apparatus, such as the projector, is being carried out to enhance a portability and a mobility thereof.

As one of the parts of an image projection apparatus, there is a focus adjustment device. The focus adjustment device adjusts a focus of an image projected onto a screen. The portable image projection apparatus, which is used in various places, may require varying a distance between the portable image projection apparatus and the screen. In this case, a user can adjust the focus of the image projected onto the screen by moving a projection lens unit with the focus adjustment device. To fabricate the portable image projection apparatus, it is necessary to miniaturize the focus adjustment device.

However, as the focus adjustment device and the portable image projection apparatus are reduced in size, it is feared that the focus adjustment device may too sensitively react to user's operation. In other words, even though the user operates the focus adjustment device only a little, the projection lens unit may be excessively moved. In this case, it is difficult to stably adjust the focus of the image projected onto the screen. Accordingly, it is desirable that the excessive reaction of the focus adjustment device be suppressed.

SUMMARY

Exemplary embodiments overcome the above disadvantages and other disadvantages not described above. Also, exemplary embodiments are not required to overcome the disadvantages described above, and an exemplary embodiment may not overcome any of the problems described above.

One or more exemplary embodiments provide a focus adjustment device adapted for use in a portable image projection apparatus.

According to an aspect of an exemplary embodiment, there is provided a focus adjustment device including a focus adjustment member that is rectilinearly movable along a first direction; a rotational shaft; a first movement-converting member that converts a rectilinear movement of the focus adjustment member into a rotary movement of the rotational shaft; and a second movement-converting member that converts the rotary movement of the rotational shaft into a rectilinear movement of a projection lens unit of an image projection apparatus along a focusing direction to thereby adjust a focus of the projection lens unit.

The second movement-converting member is configured to move the projection lens unit along the focusing direction by a second distance when the focus adjustment member moves along the first direction by a first distance which is larger than the second moving distance.

A ratio of the second distance to the first distance may be less than 1.

The ratio of the second distance to the first distance may be less than or equal to approximately 0.1.

The first movement-converting member may include a first guide slot formed in the focus adjustment member; and a first lever having a first end and a second end, wherein the first end of the first lever is connected to the rotational shaft, wherein the second end of the first lever has a first guide protrusion formed thereon, and wherein the first guide protrusion is configured to be inserted into the first guide slot.

The first guide slot may be formed to be inclined at an angle relative to the first direction.

The second movement-converting member may include a second slot formed in the projection lens unit; and a second lever having a first end and a second end; wherein the first end of the second lever is connected to the rotational shaft, wherein the second end of the second lever has a second guide protrusion formed thereon, and wherein the second guide protrusion is configured to be inserted into the second guide slot.

The second guide slot may extend vertically relative to the focusing direction of the projection lens unit.

The focus adjustment device may further include an anti-shaking member that inhibits the focus adjustment member from being shaken.

The anti-shaking member may include an anti-shaking slot extending parallel to the first direction; and an inserting part extending from the focus adjustment member and inserted in the anti-shaking slot.

The anti-shaking member may include a protrusion part extending toward a casing of the image projection apparatus from the focus adjustment member.

The focus adjustment member may include a first plate having a button formed thereon, the button being exposed to an outside of the image projection apparatus; and a second plate having the first guide slot formed therein.

The focus adjustment device may further include a guide plate having a first guide groove that guides a rectilinear movement of the first plate and a second guide groove that guides a rectilinear movement of the second plate.

An anti-shaking slot may be formed in the guide plate, the anti-shaking slot extending parallel to the first direction, and an inserting part may be formed on the focus adjustment member, the inserting part being inserted into the anti-shaking slot.

The focus adjustment device may further include a fixing unit that fixes the guide plate at a fixed position.

A plurality of ribs may be formed around the first guide slot of the focus adjust member, and wherein each one of the plurality of ribs may extend from the first guide slot of the focus adjustment member toward a border of the second guide groove of the guide plate.

According to an aspect of another exemplary embodiment, there is provided an image projection apparatus including the focus adjustment device described above. According to an aspect of another exemplary embodiment, there is provided a focus adjustment apparatus comprising: a projection lens configured to project light along an optical axis to a focal point; a user input device configured to receive an adjustment to bring the light to the focal point by moving a first distance rectilinearly along a first direction; a first lever that is mechanically coupled to the user input device such that the first lever rotates about a rotational axis in response to a rectilinear movement of the user input device along the first direction; and a second lever that is mechanically coupled to the first lever such that the second lever rotates about the rotational axis in response to the rotation of the first lever; wherein the projection lens is mechanically coupled to the second lever such that the projection lens moves a second distance along the optical axis in response to the rotation of the second lever to thereby achieve the adjustment to the focal point.

A ratio of the second distance to the first distance may be less than 1.

The ratio of the second distance to the first distance may be less than or equal to approximately 0.1.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Exemplary embodiments are described in greater detail below with reference to the accompanying drawings. In the following description, if detailed explanations on well-known functions or constructions would unnecessarily obscure an understanding of an exemplary embodiment, such detailed explanations will be omitted.

Figure 1:
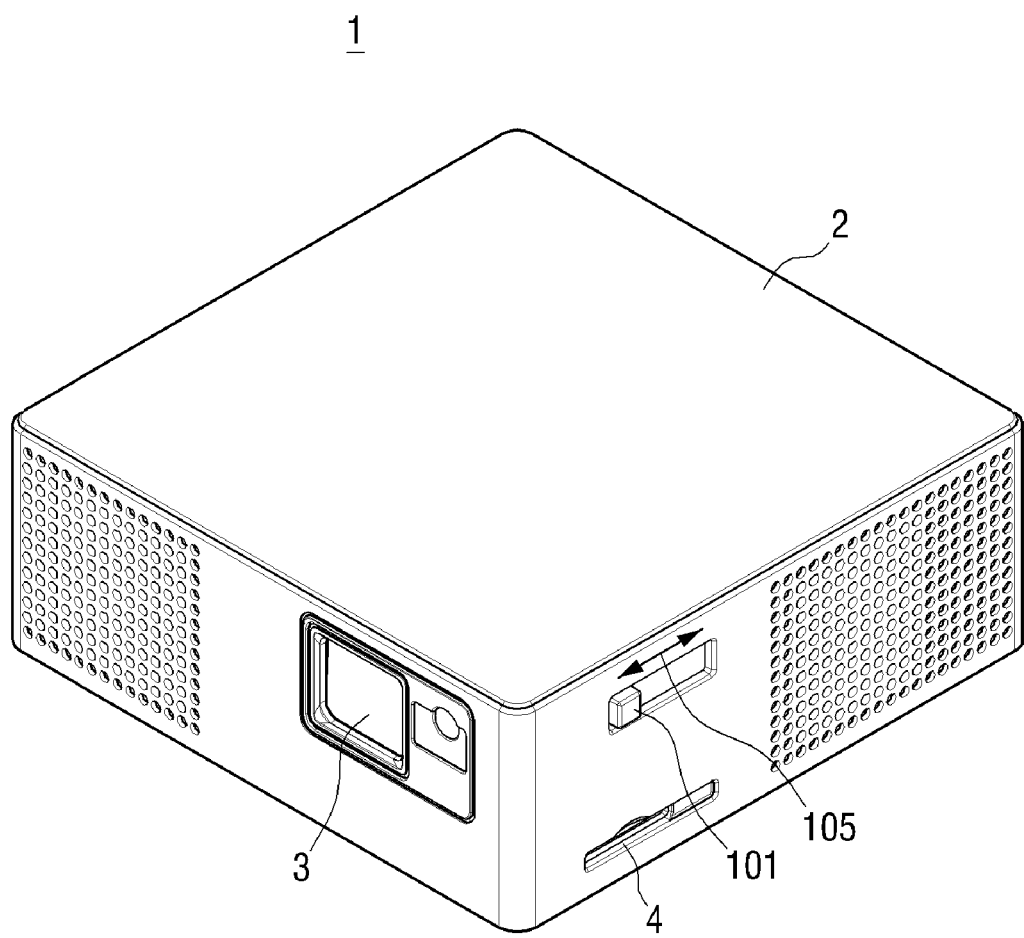
FIG. 1 is a perspective view showing an image projection apparatus according to an exemplary embodiment.

FIG. 1 is a perspective view showing an image projection apparatus 1 according to an exemplary embodiment.

A casing 2 forms an external appearance of the image projection apparatus 1, and protects parts disposed therein. A transmitting window 3 is formed in the front of the casing 2, so that a transmitted light directs toward a screen 5 (see FIG. 2) through the transmitting window 3.

A connector for receiving image data from an external source is formed in the rear of the casing 2. The image projection apparatus 1 magnifies the received image data and projects the magnified image data onto the screen 5. An opening 4 for accommodating a memory card is formed on one side of the casing 2. If the memory card is inserted in the opening 4, the image projection apparatus 1 can magnify image data stored in the memory card and project the magnified image data onto the screen 5.

Figure 2:
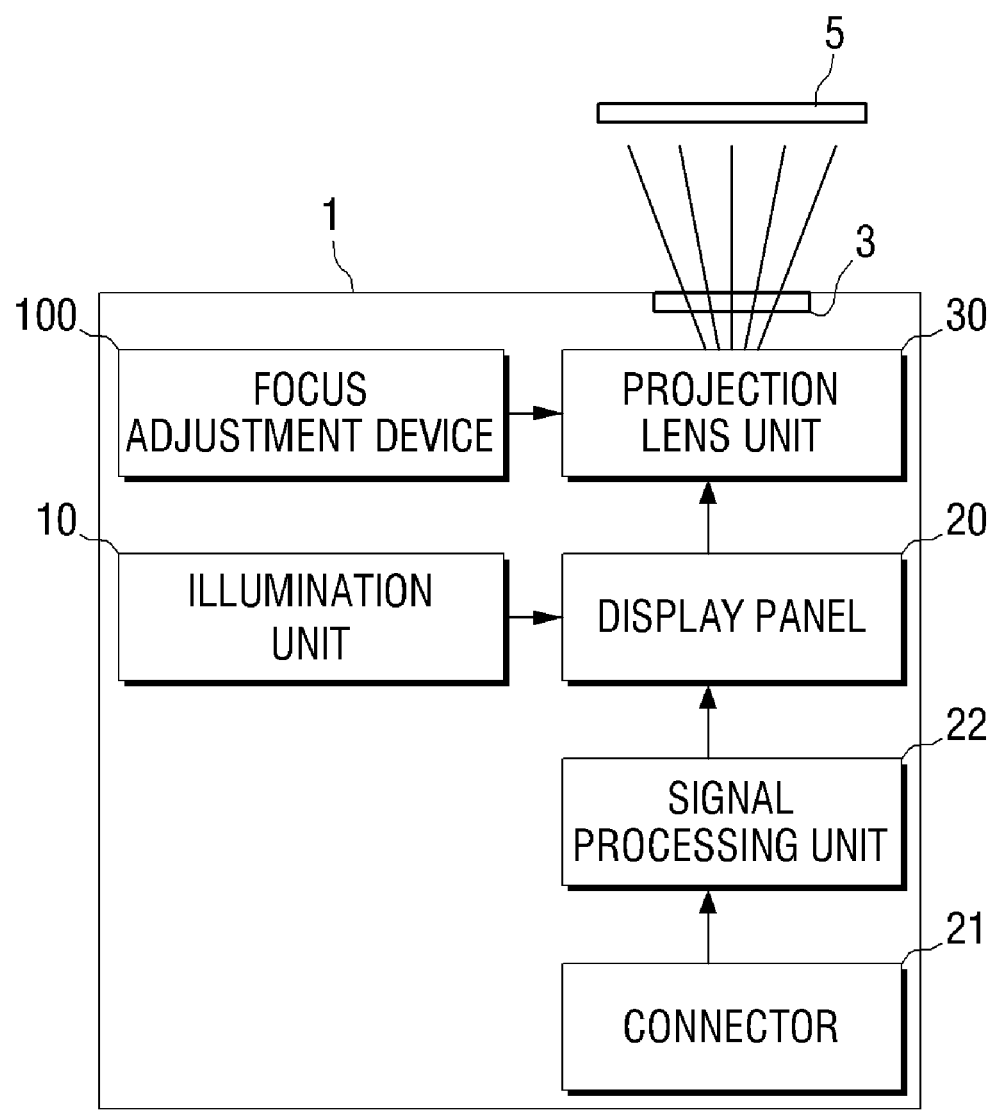
FIG. 2 is a functional block diagram showing a construction of the image projection apparatus shown in FIG. 1.

FIG. 2 is a functional block diagram showing a construction of the image projection apparatus 1 shown in FIG. 1.

The image projection apparatus 1 according to an exemplary embodiment may include an illumination unit 10, a display panel 20, a projection lens unit 30, and a focus adjustment device 100.

The illumination unit 10 generates a red light, a green light and a blue light and thus illuminates the display panel 20. The illumination unit 10 may include a light source to generate the red light, the green light and the blue light, and a dichroic mirror to combine these lights to or with one another. In an exemplary embodiment, to miniaturize the image projection apparatus 1, light emitting diodes (LED) may be used as the light source. Since a detailed structure of the illumination unit 10 would be easily understood by those skilled in the art, a detailed description thereof is omitted.

The display panel 20 forms a predetermined or given image by using the light emitted from the illumination unit 10. To operate the display panel 20, the image data received from an external source is transmitted to the display panel 20. The display panel 20 may be a liquid crystal display (LCD) panel, a liquid crystal on silicon (LCoS) panel, a digital micromirror device (DMD) panel and the like, but is not limited thereto. In an exemplary embodiment, to miniaturize the image projection apparatus 1, the DMD panel may be used as the display panel 20. Since a detailed structure of the display panel 20 would be easily understood by those skilled in the art, a detailed description thereon is omitted.

The connector 21 receives the image data from an external source and transmits them to a signal processing unit 22.

The signal processing unit 22 processes the transmitted image data to generate image signals corresponding to the image data. The image signals generated in the signal processing unit 22 are transmitted to the display panel 20, so that the display panel 20 can form a predetermined or given image corresponding to the image data. If the memory card is inserted in the opening 4, the image data stored in the memory card can be transmitted to the signal processing unit 22 so that the display panel can form a predetermined or given image corresponding to the image data stored in the memory card.

The projection lens unit 30 magnifies the image formed by the display panel 20 and projects the magnified image onto the screen 5 through the transmitting window 3. The projection lens unit 30 may include a plurality of lenses, but is not limited thereto.

The focus adjustment device 100 adjusts a focus state of the projection lens unit 30 according to a distance between the image projection apparatus 1 and the screen 5. As shown in FIG. 1, a button 101 of the focus adjustment device 100 is exposed to the outside of the image projection apparatus 1. A user can manipulate the button 101 of the focus adjustment device 100 in directions of arrows 105 as shown in FIG. 1, and with these manipulations of the user, the focus adjustment device 100 can move the projection lens unit 30 in a focusing direction and thus adjust a focus of the image projected onto the screen 5.

Figure 3A:
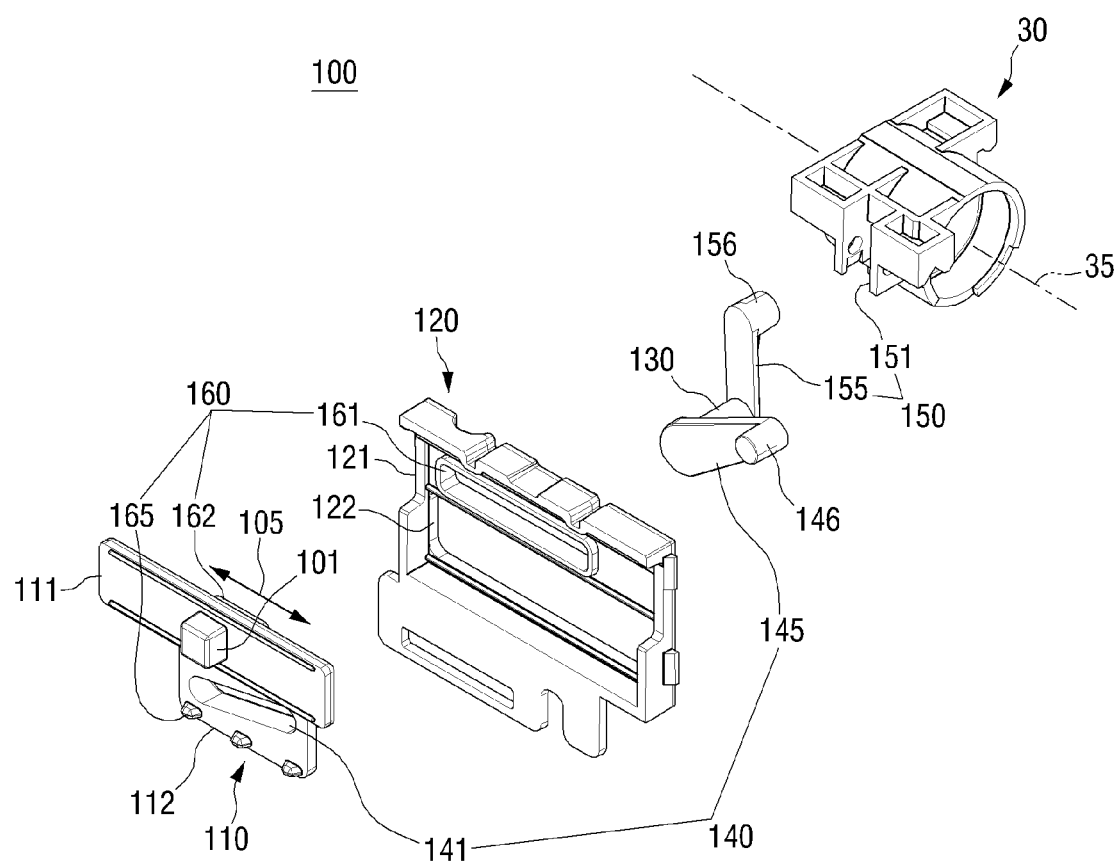
FIGS. 3A and 3B are exploded views showing a focus adjustment device according to an exemplary embodiment.
Figure 3B:
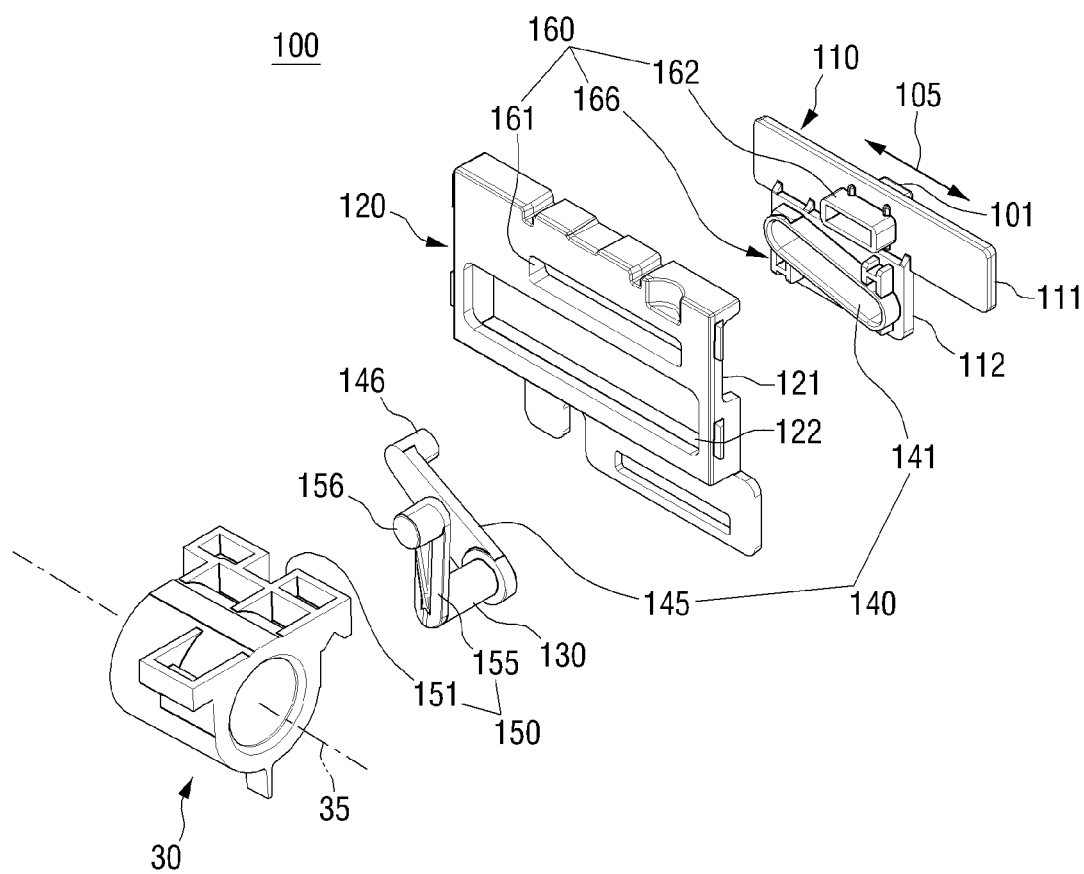
Figure 4:
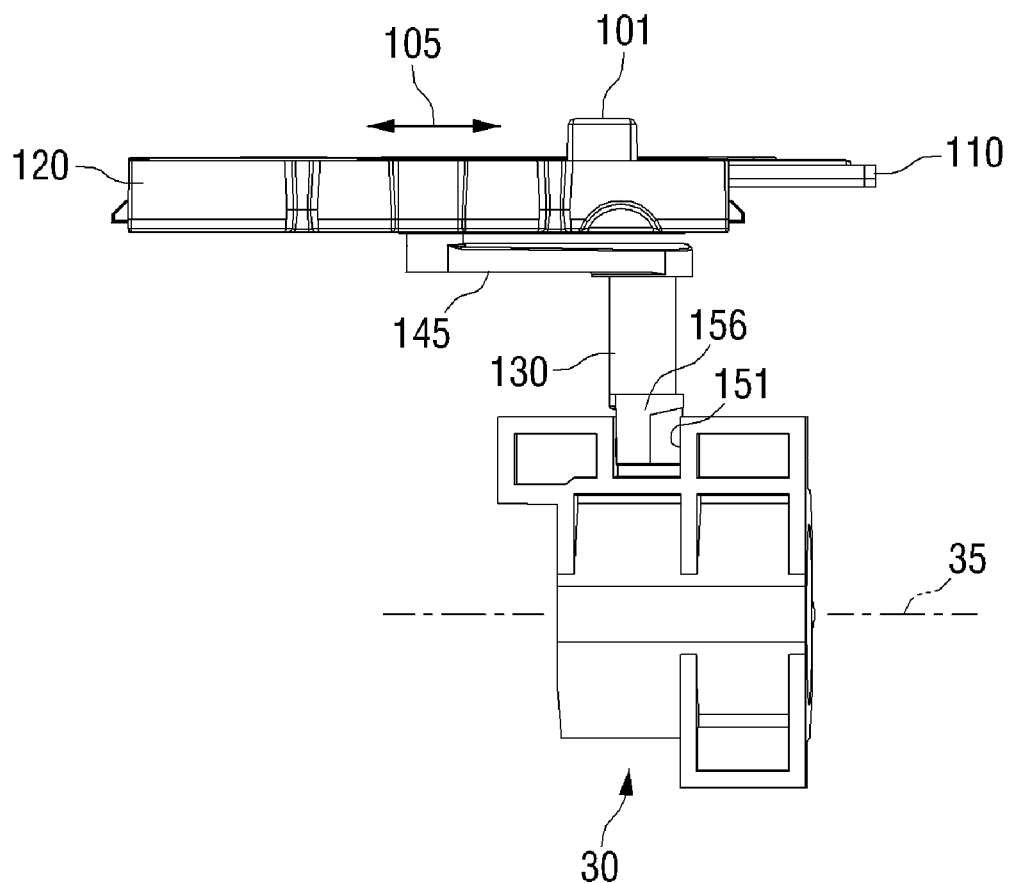
FIG. 4 is a top plan view showing a state where the focus adjustment device shown in FIGS. 3A and 3B is assembled, as viewed from above.
Figure 5:
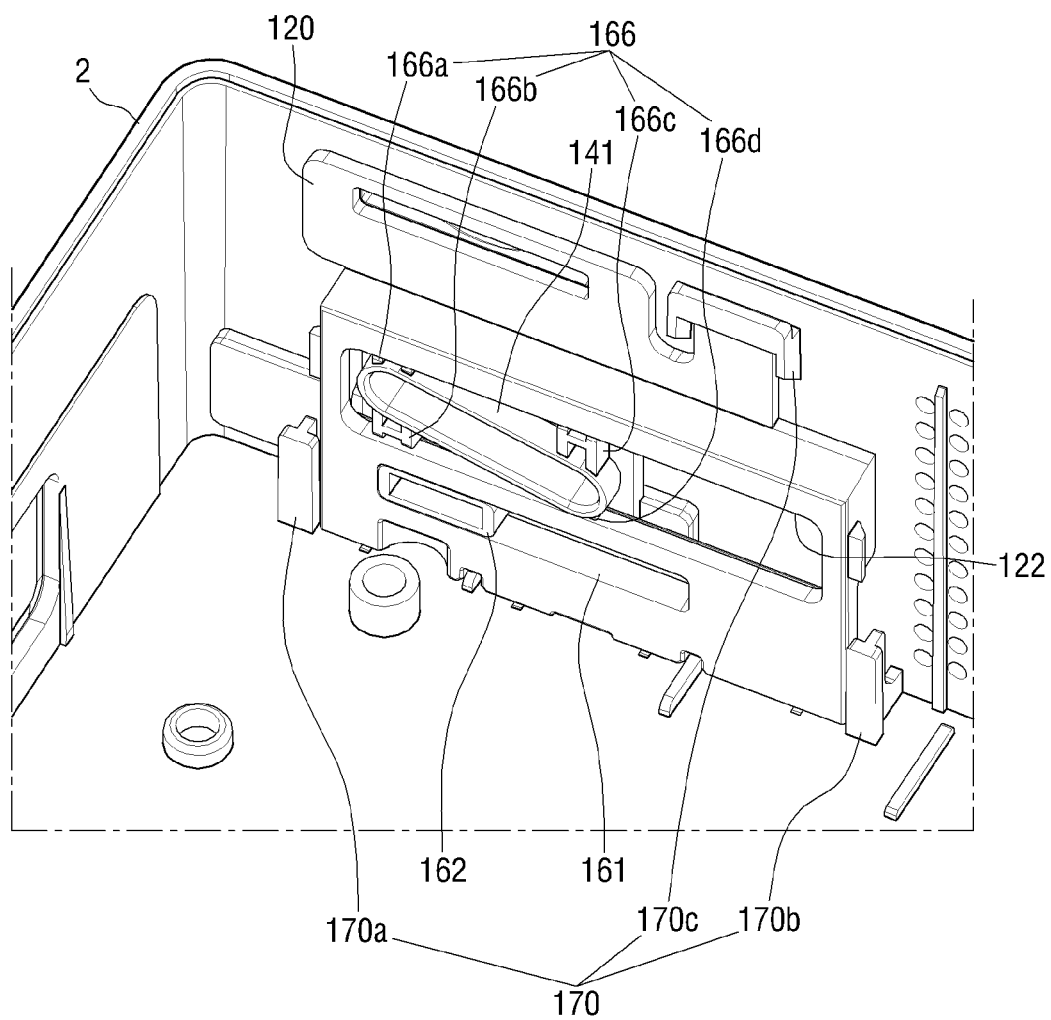
FIG. 5 is a partial perspective view showing a state where a guide plate is assembled to a casing of the image projection apparatus according to an exemplary embodiment.

FIGS. 3A and 3B are exploded views showing the focus adjustment device 100 according to an exemplary embodiment. In FIGS. 3A and 3B, to enhance a clear understanding, the focus adjustment device 100 is shown viewed from opposite angles, and the casing 2 is not shown. FIG. 4 is a top plan view showing a state where the focus adjustment device 100 shown in FIGS. 3A and 3B is assembled, as viewed from above. FIG. 5 is a partial perspective view showing a state where a guide plate 120 is assembled to the casing 2 of the image projection apparatus 1.

With reference to FIGS. 3A, 3B, 4 and 5, the focus adjustment device 100 according to an exemplary embodiment will be described in more detail.

The projection lens unit 30 may move in the focusing direction by the focus adjustment device 100. Here, the focusing direction means a direction along an optical axis where a projecting light emitted from the display panel 20 proceeds. A guide rail, not shown in FIGS. 3A and 3B, is formed to guide a focusing direction-movement of the projection lens unit 30, thereby allowing the projection lens unit 30 to move along such a guide rail. As the projection lens unit 30 moves in the focusing direction, the focus of the image projected onto the screen 5 can be adjusted.

A focus adjustment member 110 may rectilinearly move in the direction of arrows 105. That is, as the user manipulates the button 101, the position of the focus adjustment member 110 may be changed along the direction of arrows 105. In an exemplary embodiment, the focus adjustment member 110 may include a first plate 111, and a second plate 112. The first and the second plates 111 and 112 are preferably integrated with or to each other. The button 101, which is manipulated by the user, is formed on the first plate 111.

The guide plate 120 guides the rectilinear movement of the focus adjustment member 110. In an exemplary embodiment, the guide plate 120 may include a first guide groove 121, and a second guide groove 122. The first guide groove 121 is formed in both side walls of the guide plate 120 to guide a rectilinear movement of the first plate 111 of the focus adjustment member 110 and the second guide groove 122 guides a rectilinear movement of the second plate 112 of the focus adjustment member 110. Although in an exemplary embodiment, the guide plate 120 is explained as a separate member, it should be understood that the guide plate 120 may be integrated to the casing 2 or other parts.

A rotational shaft 130 is rotatably supported by a supporting member, which is not shown in the drawings. According to the rectilinear movement of the focus adjustment member 110, the rotational shaft 130 rotates.

A first movement-converting member 140 converts the rectilinear movement of the focus adjustment member 110 into a rotary movement of the rotational shaft 130. In an exemplary embodiment, the first movement-converting member 140 may include a first guide slot 141, and a first lever 145.

The first guide slot 141 is formed in the focus adjustment member 110. The first guide slot 141 may be formed to be inclined at an angle to the directions of arrows 105, that is, the direction of the rectilinear movement of the focus adjustment member 110. In an exemplary embodiment, the first guide slot 141 is formed in the second plate 112 of the focus adjustment member 110.

The first lever 145 is connected to the rotational shaft 130 at one end thereof, and has a first guide protrusion 146 at the other end thereof. The first guide protrusion 146 may be inserted in the first guide slot 141.

When the focus adjustment member 110 rectilinearly moves, the first guide protrusion 146 is moved within the first guide slot 141 to rotate the first lever 145. According to this, the rotational shaft 130 connected to the first lever 145 is also rotated.

It should be understood that the first movement-converting member 140 can be variously modified and embodied in the structure thereof as long as it can convert the rectilinear movement of the focus adjustment member 110 into the rotary movement of the rotational shaft 130.

A second movement-converting member 150 converts the rotary movement of the rotational shaft 130 into the rectilinear movement of the projection lens unit 30 along the focusing direction. In an exemplary embodiment, the second movement-converting member 150 may include a second guide slot 151, and a second lever 155.

The second guide slot 151 is formed in the projection lens unit 30. The second guide slot 151 may be formed to be vertical to the focusing direction.

The second lever 155 is connected to the rotational shaft 130 at one end thereof, and has a second guide protrusion 156 at the other end thereof. The second guide protrusion 156 may be inserted in the second guide slot 151. When the second lever 155 rotates, the second guide protrusion 156 may be moved in the second guide slot 151 to press the projection lens unit 30 in the focusing direction.

When the rotational shaft 130 rotates, the second lever 155 connected to the rotational shaft 130 is also rotated. Since the second guide protrusion 156 formed on the other end of the second lever 155 is inserted in the second guide slot 151 of the projection lens unit 30, the projection lens unit 30 is moved in the focusing direction as the second lever 155 rotates.

It should be understood that the second movement-converting member 150 can be variously modified and embodied in the structure thereof as long as it may convert the rotary movement of the rotational shaft 130 into the rectilinear movement of the projection lens unit 30 along the focusing direction. For instance, the second movement-converting member 150 may be configured in a rack-pinion combination in which a pinion is formed on the rotational shaft 130 and a rack is formed on the projection lens unit 30.

An anti-shaking member 160 prevents the focus adjustment member 110 from being shaken. A gap between the focus adjustment member 110 and the guide plate 120 may grow larger beyond a predetermined limit. This may result from tolerances in manufacturing, or abrasions or deformations on parts as the image projection apparatus 1 is used for a long time. In this case, the focus adjustment member 110 generates a shaking, and the projection lens unit 30, which is affected by the focus adjustment member 110, may be also minutely shaken. This will disturb the stable focus of the image projected onto the screen 5. However, this phenomenon can be prevented by the anti-shaking member 160. In an exemplary embodiment, the anti-shaking member 160 may include an anti-shaking slot 161, an inserting part 162, protrusion parts 165 and a plurality of ribs 166.

The anti-shaking slot 161 is formed parallel to the directions of arrows 105. In an exemplary embodiment, the anti-shaking slot 161 is formed in the guide plate 120. However, the anti-shaking slot 161 may be formed in different positions and there are no restrictions thereon.

The inserting part 162 is extended from the focus adjustment member 110 and inserted in the anti-shaking slot 161.

As the focus adjustment member 110 rectilinearly moves, the inserting part 162 is also moved within the anti-shaking slot 161. To allow the focus adjustment member 110 to rectilinearly move, the inserting part 162 and the anti-shaking slot 161 are disposed in a minutely spaced-apart relation to each other.

With the anti-shaking slot 161 and the inserting part 162 as described above, the phenomenon that the gap between the focus adjustment member 110 and the guide plate 120 grows larger can be prevented. It is also possible for the focus adjustment member 110 to stably follow the rectilinear movement.

The protrusion parts 165 are extended toward the casing 2 of the image projection apparatus 1 from the focus adjustment device 110 (see FIGS. 3A, 4 and 5). To allow the focus adjustment member 110 to follow the rectilinear movement, the protrusion parts 165 and the casing are disposed in a minutely spaced-apart relation to each other. The protrusion parts 165 can prevent the focus adjustment device 110 from being shaken in a direction toward the casing 2, that is, a direction vertical to the directions of arrows 105. It is also possible for the focus adjustment member 110 to follow the stable rectilinear movement.

As shown in FIG. 3A, three protrusion parts 165 are used in an exemplary embodiment. However, the protrusion parts 165 may be embodied by being arbitrarily changed in number, and also in shape. For instance, the protrusion parts 165 can be embodied as a single protrusion part 165 having an elongated shape.

As shown in FIGS. 3B and 5, the plurality of ribs 166 is formed around the first guide slot 141. The plurality of ribs 166 is extended toward a border of the second guide groove 122 of the guide plate 120 from the first guide slot 141. To allow the focus adjustment member 110 to follow the rectilinear movement, the plurality of ribs 166 and the border of the second guide groove 122 are disposed in a minutely spaced-apart relation to each other. With the plurality of ribs 166, the phenomenon that the gap between the focus adjustment member 110 and the guide plate 120 grows larger can be prevented. It is also possible for the focus adjustment member 110 to follow the stable rectilinear movement.

In an exemplary embodiment, the plurality of ribs 166 includes a first rib 166*a*, a second rib 166*b*, a third rib 166*c*, and a fourth rib 166*d*. The first and the second ribs 166*a* and 166*b* are formed on one end of the first guide slot 141, and the third and the fourth ribs 166*c* and 166*d* are formed on the other end of the first guide slot 141. Because the first guide slot 141 is formed to be inclined at an angle to a rectilinear movement direction of the focus adjustment direction 110, extended lengths of the second and the third ribs 166*b* and 166*c* are larger than those of the first and the fourth ribs 166*a* and 166*d*.

Although in an exemplary embodiment, the anti-shaking member is explained as using all of the anti-shaking slot 161, the inserting part 162, the protrusion parts 165 and the plurality of ribs 166, it should be understood that the anti-shaking member can be embodied with a portion of the aforementioned components omitted. For instance, the anti-shaking slot 161 and the inserting part 162, the protrusion parts 165, or the plurality of ribs 166 may be omitted. Besides these exemplary configurations, the anti-shaking member 160 can also be variously modified and embodied in the structure thereof as long as it may prevent the shaking of the focus adjustment member 110.

As shown in FIG. 5, a fixing unit 170 fixes the guide plate 120. With the fixing unit 170, the guide plate 120 can be fixed close to the casing 2 of the image projection apparatus 1. In an exemplary embodiment, the fixing unit 170 includes a first fixing rib 170*a*, a second fixing rib 170*b*, and a third fixing rib 170*c*. The first, the second and the third fixing ribs fix the guide plate 120 at different positions. The fixing unit 170 shown in FIG. 5 is only exemplary, and can be variously modified and embodied in the structure thereof. For example, if the guide plate 120 is integrated to the casing 2 or other parts, there may be no need for a separate fixing unit 170.

Figure 6:
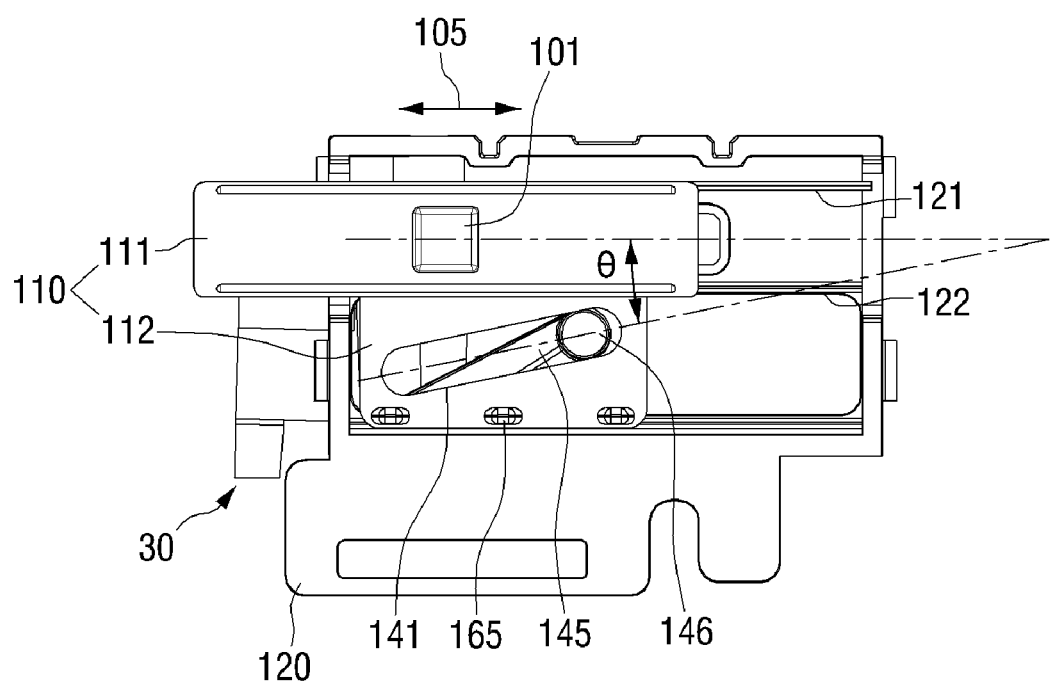
FIGS. 6 and 7 are views illustrating an operating method of the focus adjustment device.
Figure 7:
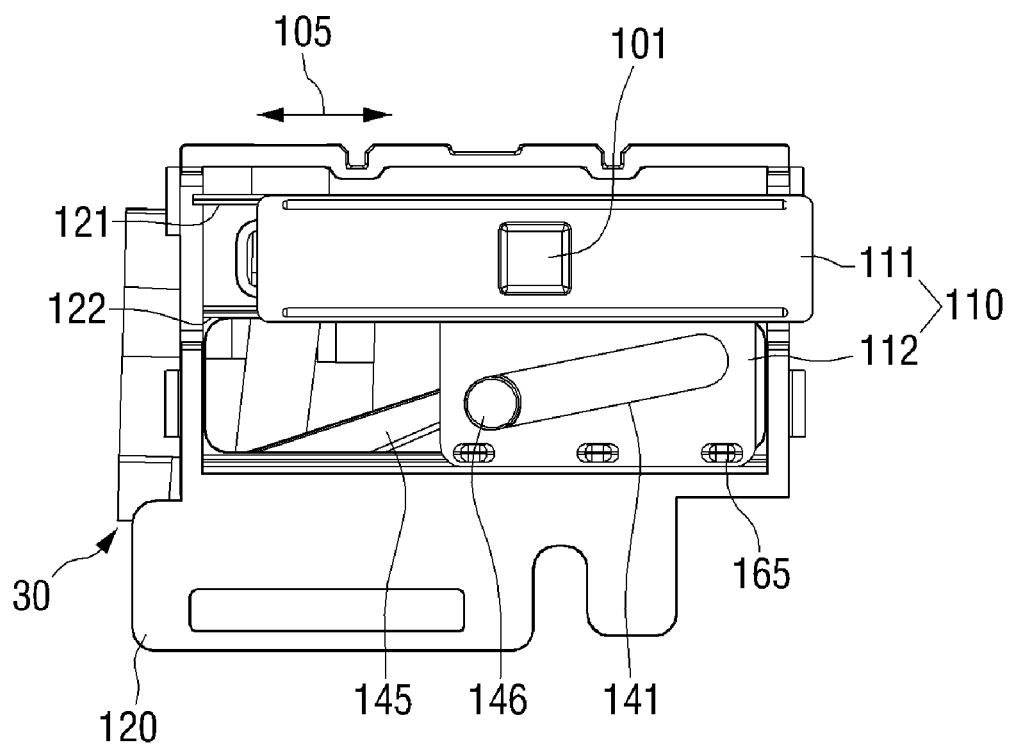

FIGS. 6 and 7 are views showing an operating method of the focus adjustment device 100. FIG. 6 shows a case where the focus adjustment member 110 is moved to a left limit, and FIG. 7 shows a case where the focus adjustment member 110 is moved to a right limit. With reference to FIGS. 6 and 7, the operating method of the focus adjustment device 100 will be described in more detail.

If the focus adjustment member 110 is located at the left limit as in FIG. 6, the first guide protrusion 146 of the first lever 145 is located in a right end of the first guide slot 141. When the focus adjustment member 110 is moved to the right, the first guide protrusion 146 of the first lever 145 is rotated clockwise in the drawings. This reason is that the first guide slot 141 is formed to be inclined to the direction of arrows 105 along which the focus adjustment member 110 moves. As the first lever 145 is rotated clockwise, the second lever 155 is also rotated clockwise and thus the projection lens unit 30 is moved to the right (see FIG. 3A).

If the focus adjustment member 110 is located at the right limit as in FIG. 7, the first guide protrusion 146 of the first lever 145 is located in a left end of the first guide slot 141. When the focus adjustment member 110 is moved to the left, the first and the second levers 145 and 155 are operated in a manner opposite to that explained above and thus the projection lens unit 30 is moved to the left.

As described above, if the user manipulates or operates the focus adjustment member 110, the positions of the projection lens unit 30 in the focusing direction are changed and thus the focus of the image projected onto the screen 5 can be adjusted.

If the image projection apparatus 1 is miniaturized, the projection lens unit 30 is reduced in size and also in a distance where the projection lens unit 30 has to move for adjusting the focus of the image projected onto the screen 5. This means that even a small amount of movement of the projection lens unit 30 can cause a large change in the focus of the image projected onto the screen 5. Accordingly, it is preferable that the focus adjustment device 100 adapted to the portable image projection apparatus 1 is not overly sensitive to user's operation.

As will be appreciated with reference to FIGS. 6 and 7, in an exemplary embodiment, the rotating amount of the first lever 145 becomes relatively smaller compared with the moving distance of the focus adjustment member 110, due to the presence of the first guide slot 141. This means that the moving distance of the projection lens unit 30 becomes smaller than the moving distance of the focus adjustment member 110. As described above, the focus adjustment device 100 according to an exemplary embodiment can reduce a sensitivity of the projection lens unit 30, thereby allowing even a miniaturized image projection apparatus 1 to stably adjust the focus of the image projected onto the screen 5.

In the following description, a ratio of the moving distance of the projection lens unit 30 to the moving distance of the focus adjustment member 110 is referred to as a distance attenuation ratio. Factors that affect the distance attenuation ratio may be a shape of the first guide slot 141, lengths of the first and the second levers 145 and 155, and so on.

The larger that a slope θ of the first guide slot 141 relative to the rectilinear movement direction of the focus adjustment member 110 becomes (that is, the more the slope is closely vertical in the drawings), the larger the rotating amount of the first lever 145 becomes, thereby allowing the moving distance of the projection lens unit 30 to increase. To the contrary, the smaller that the slope θ of the first guide slot 141 relative to the rectilinear movement direction of the focus adjustment member 110 becomes (that is, the more the slope is closely horizontal in the drawings), the smaller the rotating amount of the first lever 145 becomes, thereby allowing the moving distance of the projection lens unit 30 to decrease.

Because, if the lengths of the first and the second levers 145 and 155 are changed, the moving distances of the first and the second protrusions 146 and 156 are varied even to the same rotating amount of the rotational shaft 130, the moving distance of the projection lens unit 30 is also affected by such changes in the lengths of the first and the second levers 145 and 155.

By properly adjusting the shape of the first guide slot 141, the lengths of the first and the second levers 145 and 155 and so on, the distance attenuation ratio can be made to less than 1. Particularly, the distance attenuation ratio by the focus adjustment device 100 according to an exemplary embodiment is approximately 0.1. This means that if the focus adjustment member 110 moves by 1 cm, then the projection lens unit 30 moves by approximately 1 mm.

It can be appreciated that the focus adjustment device 100 according to an exemplary embodiment takes up a very small space in one side of the projection lens unit 30. Accordingly, the focus adjustment device can be used in a portable image projection apparatus where miniaturization is an import issue. Also, the focus adjustment device 100 according to an exemplary embodiment can realize the distance attenuation ratio of less than 1, thereby allowing even a portable image projection apparatus to stably adjust the focus of the image projected onto the screen 5.

The foregoing exemplary embodiments and advantages are merely exemplary and are not to be construed as limiting the present invention. It will be understood by those of ordinary skill in the art that the present teachings can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A focus adjustment device comprising:
   a focus adjustment member that is rectilinearly movable along a first direction;
   a rotational shaft;
   a first movement-converting member that converts a rectilinear movement of the focus adjustment member into a rotary movement of the rotational shaft; and
   a second movement-converting member that converts the rotary movement of the rotational shaft into a rectilinear movement of a projection lens unit of an image projection apparatus along a focusing direction to thereby adjust a focus of the projection lens unit.

2. The focus adjustment device of claim 1, wherein the second movement-converting member is configured to move the projection lens unit along the focusing direction by a second distance when the focus adjustment member moves along the first direction by a first distance which is larger than the second distance.

3. The focus adjustment apparatus of claim 2, wherein a ratio of the second distance to the first distance is less than 1.

4. The focus adjustment apparatus of claim 3, wherein the ratio of the second distance to the first distance is less than or equal to approximately 0.1.

5. The focus adjustment device of claim 1, wherein the first movement-converting member comprises:
   a first guide slot formed in the focus adjustment member; and
   a first lever having a first end and a second end;
   wherein the first end of the first lever is connected to the rotational shaft,
   wherein the second end of the first lever has a first guide protrusion formed thereon, and
   wherein the first guide protrusion is configured to be inserted into the first guide slot.

6. The focus adjustment device of claim 5, wherein the first guide slot is inclined at an angle relative to the first direction.

7. The focus adjustment device of claim 5, wherein the focus adjustment member comprises:
   a first plate having a button formed thereon, the button being exposed to an outside of the image projection apparatus; and
   a second plate having the first guide slot formed therein.

8. The focus adjustment device of claim 7, further comprising a guide plate having:
   a first guide groove that guides a rectilinear movement of the first plate; and
   a second guide groove that guides a rectilinear movement of the second plate.

9. The focus adjustment device of claim 8,
   wherein an anti-shaking slot is formed in the guide plate, the anti-shaking slot extending parallel to the first direction, and
   an inserting part is formed on the focus adjustment member, the inserting part being inserted into the anti-shaking slot.

10. The focus adjustment device of claim 8, further comprising a fixing unit that fixes the guide plate at a fixed position.

11. The focus adjustment device of claim 8,
    wherein a plurality of ribs are formed around the first guide slot of the focus adjustment member, and
    wherein each one of the plurality of ribs extends from the first guide slot of the focus adjustment member toward a border of the second guide groove of the guide plate.

12. The focus adjustment device of claim 1, wherein the second movement-converting member comprises:
    a second guide slot formed in the projection lens unit; and
    a second lever having a first end and a second end;
    wherein the first end of the second lever is connected to the rotational shaft,
    wherein the second end of the second lever has a second guide protrusion formed thereon, and
    wherein the second guide protrusion is configured to be inserted into the second guide slot.

13. The focus adjustment device of claim 12, wherein the second guide slot extends vertically relative to the focusing direction of the projection lens unit.

14. The focus adjustment device of claim 1, further comprising:
    an anti-shaking member that inhibits the focus adjustment member from being shaken.

15. The focus adjustment device of claim 14, wherein the anti-shaking member comprises:
    an anti-shaking slot extending parallel to the first direction; and
    an inserting part extending from the focus adjustment member and inserted into the anti-shaking slot.

16. The focus adjustment device of claim 14, wherein the anti-shaking member comprises a protrusion part extending toward a casing of the image projection apparatus from the focus adjustment member.

17. An image projection apparatus comprising the focus adjustment device according to claim 1.

18. A focus adjustment apparatus comprising:
a projection lens configured to project light along an optical axis to a focal point;
a user input device configured to receive an adjustment to bring the light to the focal point by moving a first distance rectilinearly along a first direction;
a first lever that is mechanically coupled to the user input device such that the first lever rotates about a rotational axis in response to a rectilinear movement of the user input device along the first direction; and
a second lever that is mechanically coupled to the first lever such that the second lever rotates about the rotational axis in response to the rotation of the first lever;
wherein the projection lens is mechanically coupled to the second lever such that the projection lens moves a second distance along the optical axis in response to the rotation of the second lever to thereby achieve the adjustment to the focal point.

19. The focus adjustment apparatus of claim 18, wherein a ratio of the second distance to the first distance is less than 1.

20. The focus adjustment apparatus of claim 19, wherein the ratio of the second distance to the first distance is less than or equal to approximately 0.1.

* * * * *